United States Patent Office 3,644,453
Patented Feb. 22, 1972

3,644,453
CUPROUS HALIDE AND ADIPONITRILE COMPLEXES
Olav T. Onsager, Waldwick, N.J., assignor to Halcon International, Inc.
No Drawing. Filed Dec. 11, 1969, Ser. No. 884,379
Int. Cl. C07f 1/08
U.S. Cl. 260—438.1                    2 Claims

ABSTRACT OF THE DISCLOSURE

The present invention is directed to novel chemical complexes of cuprous bromide, cuprous chloride and adiponitrile. The complexes are useful, for example, as catalysts, as promoters, as a source of adiponitrile, as paint dryers and the like.

BACKGROUND OF THE INVENTION

The present invention is concerned with novel complexes of cuprous bromide or cuprous chloride and adiponitrile. In addition, the invention is concerned with methods of preparing these novel complexes.

The art is familiar with complexes of various metal halides such as ruthenium halide with materials such as nitriles. See for example U.S. Pat. 3,449,387. However, the present inventor is unaware of any pertinent prior art which pertains to the particular complexes which are the subject of the present invention.

RELATED APPLICATIONS

Patent applications which are generally related to the present case are U.S. Serial No. 835,722, filed June 23, 1969 and Ser. No. 872,395, filed Oct. 29, 1969.

DETAILS OF THE INVENTION

The present invention is concerned with novel complexes having the formula $Cu_2Br_2 \cdot NC(CH_2)_4CN$ and $Cu_2Cl_2 \cdot NC(CH_2)_4CN$ These materials are useful as catalysts for example in the decomposition of peroxides, as fungicides, as paint dryers, as promoters in the reductive coupling of haloorganic compounds including beta-halopropionitrile, as a source of adiponitrile and the like.

The novel and inventive complexes of this invention can be prepared in a number of different ways. For example, the complex is conveniently prepared by reacting the cuprous halide with adiponitrile at temperatures ranging from about 20 to 300° C., preferably 50 to 250° C., and most desirably 100 to 200° C. It is usually desired to employ adiponitrile in excess of the stoichiometric amount although this is not an absolute requirement. The reaction is conducted at the above temperatures and under pressure sufficient to maintain the adiponitrile in the liquid phase. Inert solvents such as benzene, toluene, heptane, cyclohexane, acetone, dioxane, propionitrile, chlorobenzene and 3-bromopropionitrile can also be employed. In this preparation it is desirable to avoid the presence of water as this tends to interfere with the formation of the inventive complex and thus the preparation should be carried out under substantially anhydrous conditions.

As an alternative method of operation, the novel complexes are prepared as a result of the reductive coupling of beta-bromopropionitrile or beta-chloropropionitrile in the presence of metallic copper as reductive coupling reactant. In the liquid phase reductive coupling involving copper as coupling agent such as described for example in copending case the liquid reaction product mixture contains substantial amounts of the complex which is the subject of this invention. In such procedures the complex itself can be recovered from the reaction mixture. The complex produced in this fashion is an important source of adiponitrile which can be recovered therefrom by appropriate procedures which include contact with water, elevated temperature distillation and the like.

The novel complexes are stable compounds having an elemental analysis corresponding respectively to $Cu_2Br_2 \cdot NC—(CH_2)_4—CN$ and
$Cu_2Cl_2 \cdot NC—(CH_2)_4—CN$ The cuprous bromide complex has a melting point of about 173° C. and is a light greenish tan solid. The cuprous chloride complex has a melting point of about 124° C. and is a light greenish grey solid.

The invention is illustrated by the following examples.

EXAMPLE 1

The $C_2Br_2 \cdot NC—(CH_2)_4—CN$ complex is prepared by preparing a reaction mixture consisting of 15 grams anhydrous cuprous bromide and 50 parts cc. adiponitrile. This mixture is heated with stirring at 170° C. for 1.5 hours. The resulting solution is filtered hot (at 160° C.) and cooled to about room temperature. After 3 hours the formed crystals are separated by filtration, washed with 10 cc. adiponitrile and 5 times with 10 cc. acetone. The washed crystals are vacuum dried at 50° C. (5 mm. Hg). All stages of the preparation and recovery are carried out under a nitrogen atmosphere and all reagents are thoroughly dried prior to use. The yield of crystals is 12.2 grams.

The crystals are light greenish tan in color and have a melting point of about 173° C. The infrared spectrum of the product pressed in a KBr pellet showed two nitrile bands at 2250 and 2270 cm.$^{-1}$. Elemental analysis of the product corresponded substantially to the formula $Cu_2Br_2 \cdot NC(CH_2)_4CN$

EXAMPLE 2

The $Cu_2Cl_2 \cdot NC—(CH_2)_4—CN$ complex is prepared using the experimental procedure as described in Example 1 except that cuprous chloride is used in place of the cuprous bromide. The yield of crystals is 20.6 grams. The crystals are light greenish grey in color and have a melting point about 124° C. The infra red spectrum of the product pressed in a KBr pellet showed two nitrile bands at 2242 cm.$^{-1}$ and 2272 cm.$^{-1}$. Elemental analysis of the product corresponding substantially to the formula $Cu_2Cl_2 \cdot NC—(CH_2)_4—CN$

EXAMPLE 3

In order to demonstrate the utility of the complex which is the subject of the present invention, an experiment was performed whereby beta-bromopropionitrile was reductively coupled in the presence of a coupling agent comprising metallic iron and the present inventive complexes (Runs A and B). The details of this reductive coupling and of a similar reductive coupling but which did not employ the said inventive complex (Run C) are as follows:

The reactions A, B and C are carried out in a 1000 cc. stirred glass reactor. In Run A is charged:

29 g. 3-bromopropionitrile
8 g. acrylonitrile
20 g. Fe powder
20 g. $Cu_2Br_2 \cdot NC—(CH_2)_4—CN$ complex In Run B is charged:

292 g. 3-bromopropionitrile
8 g. acrylonitrile
20 g. Fe powder
20 g. $Cu_2Cl_2 \cdot NC—(CH_2)_4—CN$ complex In Run C is charged:
- 292 g. 3-bromoproponitrile
- 8 g. acrylonitrile
- 20 g. Fe powder Each reaction mixture is heated with agitation for 2 hours at 150° C. Then cooled to room temperature and analyzed for the amount of adiponitrile formed and converted reducing agent. The results are summarized in Table 1 and clearly demonstrate the effect of the present inventive complexes as promoting salts in the reductive coupling of 3-bromopropionitrile with metallic iron as the reducing agent.

TABLE I

|  | Run A | Run B | Run C |
|---|---|---|---|
| Coupling metal conversion, percent | 90 | 45 | 10 |
| Selectivity to adiponitrile based on converted metal, mol percent | 45 | 23 | 20 |

I claim:
1. A complex having the formula

$$Cu_2Br_2 \cdot NC(CH_2)_4CN$$

2. A complex having the formula $$Cu_2Cl_2 \cdot NC-(CH_2)_4-CN$$

References Cited

UNITED STATES PATENTS 3,197,493   7/1965   Allison _____ 260—438.1

OTHER REFERENCES

Chemical Abstracts, vol. 67, 73250 (1967).
Chemical Abstracts, vol. 69, 56613u (1968).
Chemical Abstracts, vol. 66, 101190e (1967).
Chemical Abstracts, vol. 54, 16982g (1960).
Anal. Chem., vol. 35, No. 12, November 1963.
Hackh's Chemical Dictionary, McGraw-Hill Book Company, Inc., pp. 242, 243 (1944).

DELBERT E. GANTZ, Primary Examiner

H. M. S. SNEED, Assistant Examiner

U.S. Cl. X.R.

106—310; 252—431; 260—465.8, 999